US006429779B1

United States Patent
Petrillo et al.

(10) Patent No.: US 6,429,779 B1
(45) Date of Patent: Aug. 6, 2002

(54) TELEPHONE LINE MONITORING AND ALARM APPARATUS

(76) Inventors: Gino Petrillo, 176 Tower Street, Beaconsfield QBC (CA), H9W 6B2; Brian Deane, 229 Gilford Avenue, Beaconsfield QBC (CA), H9W 1L3; Surjit Matharu, 21 Willowbrook Avenue, Beaconsfield QBC (CA), H9W 3P8; Christian De Saint-Rome, 5500 MacDonald Avenue, #304, Montreal QBC (CA), H3X 2W5

( * ) Notice: Subject to any disclaimer, the term of this patent is extended or adjusted under 35 U.S.C. 154(b) by 0 days.

(21) Appl. No.: 09/745,869

(22) Filed: Dec. 26, 2000

(51) Int. Cl.[7] .............................................. G08B 21/00
(52) U.S. Cl. ........................ 340/644; 340/654; 340/656; 439/638; 379/33; 379/35
(58) Field of Search ................................ 340/644, 635, 340/654, 656; 439/638; 379/21, 27, 33, 35

(56) References Cited

U.S. PATENT DOCUMENTS

| 3,801,974 | A | * | 4/1974 | Aitken | 340/654 |
| 4,155,082 | A | * | 5/1979 | Jones et al. | 340/656 |
| 4,969,179 | A | * | 11/1990 | Kanare et al. | 379/33 |
| 5,062,131 | A | * | 10/1991 | Kanare et al. | 379/33 |
| 5,328,390 | A | * | 7/1994 | Johnston et al. | 439/638 |
| 5,663,711 | A | * | 9/1997 | Sanders et al. | 340/635 |
| 5,696,810 | A | * | 12/1997 | Dunn | 379/32 |
| 6,002,747 | A | * | 12/1999 | Eftechiou | 379/35 |

* cited by examiner

Primary Examiner—John Tweel
(74) Attorney, Agent, or Firm—Holland & Knight LLP (57) ABSTRACT

A telephone line monitoring and alarm apparatus capable of continuously monitoring telephone line status and activating an audio-visual alarm if the telephone line becomes inoperative, incorporates an integral telephone plug to permit direct plug-in connection of the apparatus to a standard telephone wall jack as a self-contained and autonomous unit without the use of interconnecting cables or cable-plug attachments. An integral dual telephone jack splitter permits the uninterrupted use of standard telecommunication equipment, such as telephones, answering machines, or facsimile equipment while the apparatus monitors telephone line integrity. Micropower circuitry derives electrical power from the telephone line to provide visual ON status indication, and from a battery source independently of the telephone communication line voltage, to provide continuous telephone line monitoring, audio-visual alarms and audio-visual low battery voltage indication. The invention is intended to provide telephone subscribers with effective early detection and warning if the telephone line becomes inoperative due to intentional or accidental disruption of telephone service.

33 Claims, 3 Drawing Sheets

TELEPHONE LINE MONITORING AND ALARM APPARATUS

FIELD OF THE INVENTION

This invention relates generally to telephone line monitoring and alarm apparatus, and more specifically to an apparatus for continuously monitoring the status of a telephone line and activating an audio-visual alarm if the telephone line becomes inoperative due to intentional or accidental disruption of telephone service.

BACKGROUND OF THE INVENTION

Telephone service to a subscriber may be disrupted as a result of a malfunction occurring on the utility-provided central office line or on-premise subscriber line. A telephone line may become inoperative due to accidental breakage or shorting, as may occur from inclement weather, or through deliberate action, such as during a burglary in which the on-premise subscriber line is cut to disconnect an alarm system from a central monitoring station or prevent a victim from calling for assistance. Regardless of the cause of the disruption, the telephone subscriber will be without telephone service and will, in general, not be aware that the telephone line is inoperative. It is therefore desirable to have a simple and reliable telephone line monitor and alarm means which functions to continuously monitor the integrity of the telephone line and alert a subscriber by both visual and auditory signals if a disruption in telephone service occurs.

Apparatus designed to assess the status and integrity of a telephone line may be broadly grouped into two principal types: 1. Intermittent use test instruments intended primarily for use by professionals skilled in telephone system maintenance and repair. Equipment of this kind typically includes a variety of display devices such as meters or LED indicators and may be specifically adapted to test for line faults by interconnection to the central office or subscriber segment of the telephone line 2. Continuous line monitoring apparatus intended as on-premise devices which are connected directly to the subscriber segment of the telephone line and provide continuous fault detection and alarm warning if service is disrupted. Both types of apparatus may test for open circuit, line-to-ground faults, the presence of extraneous AC voltage, or abnormal impedance characteristics in either the tip or ring conductors of the telephone line. Moreover, telephone line test and monitoring devices may be based on simple line voltage sensing, impedance measurement by means of current sensing, or extraneous AC voltage fault detection.

In the case of telephone line monitoring apparatus intended for continuous use on the subscriber premises, the primary objective is to alert the subscriber by both visual and auditory means if telephone service is disrupted. Advances in the current art of continuous telephone line monitoring apparatus are needed in order to meet this objective in a reliable, cost-effective and simple manner based on innovative features which also enhance product convenience and manner of use.

It is appreciated that numerous telephone line monitors are known in the art. Examples are U.S. Pat. No. 5,696,810 to Dunn, U.S. Pat. Nos. 5,056,131 and 4,969,179 to Kanare and Rehler, and U.S. Pat. No. 4,969,178 to Chen and Loao.

In U.S. Pat. No. 5,696,810, an apparatus is disclosed for monitoring the integrity of a telephone line and for warning when the line is inoperative. The device comprises a monitoring unit which continuously senses line voltage and generates a control signal which assumes a first value when the line is operational and a second value when the line is inoperative. A battery powered audio alarm is activated when said control signal assumes a second value corresponding to an inoperative line condition. Connection of the device to the telephone line is made by means of a standard telephone cable and plug.

Exemplary continuous telephone line monitors which provide both visual and auditory alarms if the telephone line becomes inoperative may be found in U.S. Pat. Nos. 5,056, 131 and 4,969,179. In U.S. Pat. No. 5,056,131, there is provided means for activating a self-flashing light emitting diode and an auditory sounder having alternating loud and soft output in response to a detected low voltage fault condition on the telephone line. The monitoring and alarm circuitry is powered by a battery, or by an AC source with battery back-up. U.S. Pat No. 4,969,179 discloses a continuous telephone line monitor which activates a light emitting diode and auditory sounder if line voltage falls below approximately 6 VDC, corresponding to a short or open circuit fault condition. In both disclosures connection of the device to the telephone line is made in standard fashion by means of a telephone cable and plug.

In U.S. Pat. No. 4,969,178 a multipurpose subscriber telephone line monitor is provided which uses a voltage detecting circuit, a current detecting circuit, two control circuits and a comparator circuit to detect open-circuit, short-circuit, or illegal connection of the subscriber local line. An alarm circuit is employed to generate an audio alarm signal when the telephone line becomes inoperative.

In summary, the prior art has evolved to provide varied and effective means for continuous telephone line monitoring and alarm activation in response to fault conditions having accidental or deliberate origin and which result in a disruption in telephone service to a subscriber. However, simple and reliable means for connecting a telephone line monitor to a standard telephone line, have either not been addressed, or have involved the use of hard-wiring or cable-plug attachments to effect said monitor-telephone line connection. The use of hard-wired connections or cable-plug attachments may be undesirable in many routine consumer applications, however, because of the need for special skills in the case of hard-wiring and the loss of telephone jack access for other telecommunication equipment in the case of cable-plug configurations. Moreover, although the prior art is predominantly based on battery powered or battery back-up operation to activate alarms in the event of telephone service disruption, little or no attention has been given to low battery voltage sensing and audio-visual warning to permit battery replacement in a timely manner in order to ensure on-going product reliability. Finally, the prior art in continuous telephone line monitors has not provided for a simple and effective means to indicate that the device is ON and operational as opposed to connected but in the OFF state, a feature which is of significant importance in view of the intended application.

Therefore, in many continuous telephone line monitoring applications, it is desirable to provide a simple and reliable means for continuously monitoring telephone line status and activating an audio-visual alarm if the telephone line becomes inoperative, comprising direct plug-in connection to a standard telephone wall jack as a self-contained and autonomous unit without interconnecting cables or cable-plug attachments. It is further desirable for said apparatus to provide integral means to permit the uninterrupted use of standard telecommunication equipment, such as telephones, answering machines, or facsimile equipment, with said monitoring and alarm apparatus. Moreover, telephone monitoring and alarm apparatus must incorporate audio-visual low battery indicating means and ON status indicating means to be effective in continuous-use consumer applications.

SUMMARY OF THE INVENTION

It is thus an object of the present invention to provide a telephone line monitor and alarm means capable of continuously monitoring line status and activating an audio-visual alarm if the telephone line becomes inoperative, said means capable of direct plug-in connection to a standard telephone wall jack as a self-contained and autonomous unit without interconnecting cables or cable-plug attachments.

It is a further object of the present invention to provide a dual jack splitter as an integral part of said self-contained and autonomous telephone line monitor and alarm means, in order to permit the uninterrupted use of standard telecommunication equipment, such as telephones, answering machines, or facsimile equipment, with said monitor and alarm means plugged into a standard telephone wall jack.

It is a further object of the present invention to provide continuous battery voltage sensing and audio-visual low battery voltage indicating means in order to alert the user of the need to replace the battery in said self-contained and autonomous telephone line monitor and alarm means.

It is a further object of the present invention to provide a simple visual means of ON status indication in said self-contained and autonomous telephone line monitor and alarm means.

It is a further object of the present invention to provide the mechanical configurations for said self-contained and autonomous telephone line monitor and alarm means, so as to permit the implementation of said means in a simple and reliable manner, thereby improving performance while at the same time maintaining a high level of reliability in continuous telephone line monitoring and alarm apparatus.

To achieve the foregoing objects, and in accordance with the purposes of the invention as embodied and broadly described herein, there is provided an apparatus comprising a mechanical enclosure and associated electrical circuit, a telephone plug and dual jack splitter communicating with said electrical circuit means and forming permanent and integral parts of said mechanical enclosure means.

According to an advantageous embodiment of the mechanical enclosure according to the invention, a telephone plug having electrical contacts and mechanical design compatible for use with standard telephone jacks, is moulded as an integral part of said mechanical enclosure means, or comprises a separate component and permanently attached to said means.

According to another advantageous embodiment of the mechanical enclosure according to the invention, a dual telephone jack splitter having electrical contacts and mechanical design compatible for use with standard telephone plugs found on telecommunication equipment, is moulded as an integral part of said mechanical enclosure means, or comprises a separate component and permanently attached to said means.

According to yet another advantageous embodiment of the mechanical enclosure according to the invention, said telephone plug is situated on the back face of said mechanical enclosure means and said dual jack splitter is situated on the front face of said mechanical enclosure means.

To implement the foregoing advantageous features in accordance with the invention as embodied and broadly described herein, there is provided a circuit for continuous telephone line monitoring means, audio-visual alarm means, audio-visual low battery voltage indicating means and ON status indicating means.

According to an advantageous embodiment of the circuit according to the invention, telephone line voltage is continuously monitored by a battery operated micropower voltage threshold responsive circuit, for example by an IC comparator or discrete FET-input configuration, wherein said voltage threshold responsive circuit assumes a first "normal" output state when telephone line voltage is above a predefined threshold value corresponding to standard telephone line operation, and a second "alarm" output state if telephone line voltage falls below standard telephone line voltage requirements, corresponding to loss of telephone service.

According to an advantageous feature of this embodiment, said telephone line voltage threshold responsive circuit means is capable of activating an audio alarm oscillator and visual alarm driver circuit upon assuming said second "alarm" output state, the audio oscillator means driving an audio alarm component, for example a piezo acoustic element, and the visual alarm driver circuit activating a visual alarm component, for example a light emitting diode (LED), said audio-visual alarm being distinctively associated with loss of telephone service.

According to another advantageous embodiment of the circuit according to the invention, battery voltage is continuously monitored by a micropower voltage threshold responsive circuit, for example by an IC comparator or discrete FET-input configuration, wherein said voltage threshold responsive circuit assumes a first "normal" output state when battery voltage is greater than a predefined threshold value, corresponding to an acceptable battery state of charge, and a second "alarm" output state if battery voltage falls below said predefined threshold, indicating that battery replacement is necessary.

According to an advantageous feature of this embodiment, said battery voltage threshold responsive circuit means is capable of activating an audio alarm oscillator and visual alarm driver circuit upon assuming said second "alarm" output state, the audio oscillator means driving an audio alarm component, for example a piezo acoustic element, and the visual alarm driver circuit activating a visual alarm component, for example an LED, said audio-visual alarm being distinctively associated with low battery voltage.

According to yet another advantageous embodiment of the circuit according to the invention, ON status indication is provided by a micropower pulse generating circuit based on IC or discrete component timer configurations, said pulse generating circuit activating a visual indicating component, for example an LED.

BRIEF DESCRIPTION OF THE DRAWINGS

Additional objects, features and advantages of the present invention will become more fully apparent from the following description and appended claims taken in conjunction with the accompanying drawings, wherein:

DETAILED DESCRIPTION OF THE PREFERRED EMBODIMENTS

The preferred embodiments of the present invention are now described with reference to the accompanying Figures, wherein the same reference numerals are used for the same elements throughout the various views. The embodiments described herein are by way of example only and merely illustrative of possible embodiments of the principles of the invention. Changes and modifications to these embodiments obvious to one skilled in the art to which the invention pertains are deemed to be within the spirit, scope and extent of the invention as described in detail herein and further defined in the appended claims.

Figure 1:
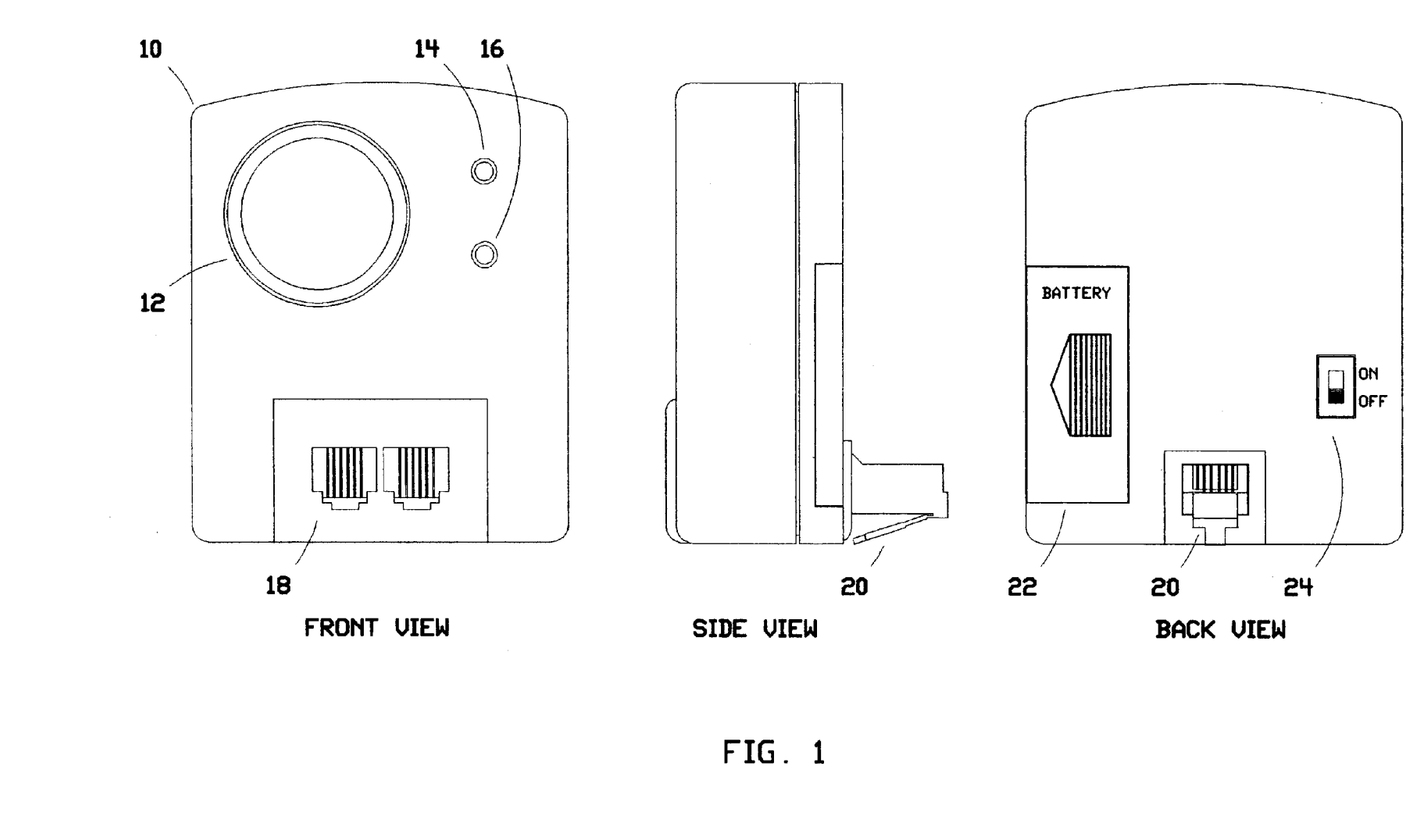
FIG. 1 illustrates the mechanical features of a telephone line monitor and alarm apparatus, according to the principles of the invention.

In FIG. 1, there is illustrated a preferred. embodiment of a telephone line monitor and alarm apparatus according to the invention, the apparatus comprising housing means 10, housing means 10 further incorporating audio resonator cavity 12, ON status LED 14, alarm LED 16 and integral dual jack splitter 18 at its front face, and telephone plug 20, battery door 22 and switch means 24 at its back face. Circuit means for the apparatus according to the invention, preferred embodiments described in detail hereinafter, are incorporated within housing means 10 and communicate with said resonator cavity, ON status and alarm LEDs, dual jack splitter, telephone plug and switch means. Housing means 10, may be any suitable enclosure for the circuit means embodied by the invention, preferably comprising a moulded package constructed of ABS plastic or other suitable material.

Broadly described, the apparatus illustrated in FIG. 1 is capable of direct plug-in connection to a standard telephone wall jack as a self-contained and autonomous telephone line monitor and alarm unit, said direct plug-in capability constituting an advantageous embodiment of the apparatus according to the invention and made possible through the implementation of telephone plug 20 as an integral component of the apparatus. Telephone plug 20, is incorporated as a permanent component of the apparatus through permanent attachment to, or forming a moulded part of, housing means 10. Integral dual jack splitter 18, communicates with telephone plug 20, through circuit means situated inside housing 10, to provide direct telephone line access for telecommunication equipment, such as telephones, answering machines, or facsimile equipment with the apparatus of the present invention in use. Thus, the exemplary embodiment of the invention as depicted in FIG. 1, has the advantage of permitting continuous and uninterrupted use of standard telecommunication equipment while the apparatus of the present invention continuously monitors the telephone line, said advantageous embodiment achieved without the use of separate cable-plug, or cable jack attachments.

Figure 2:
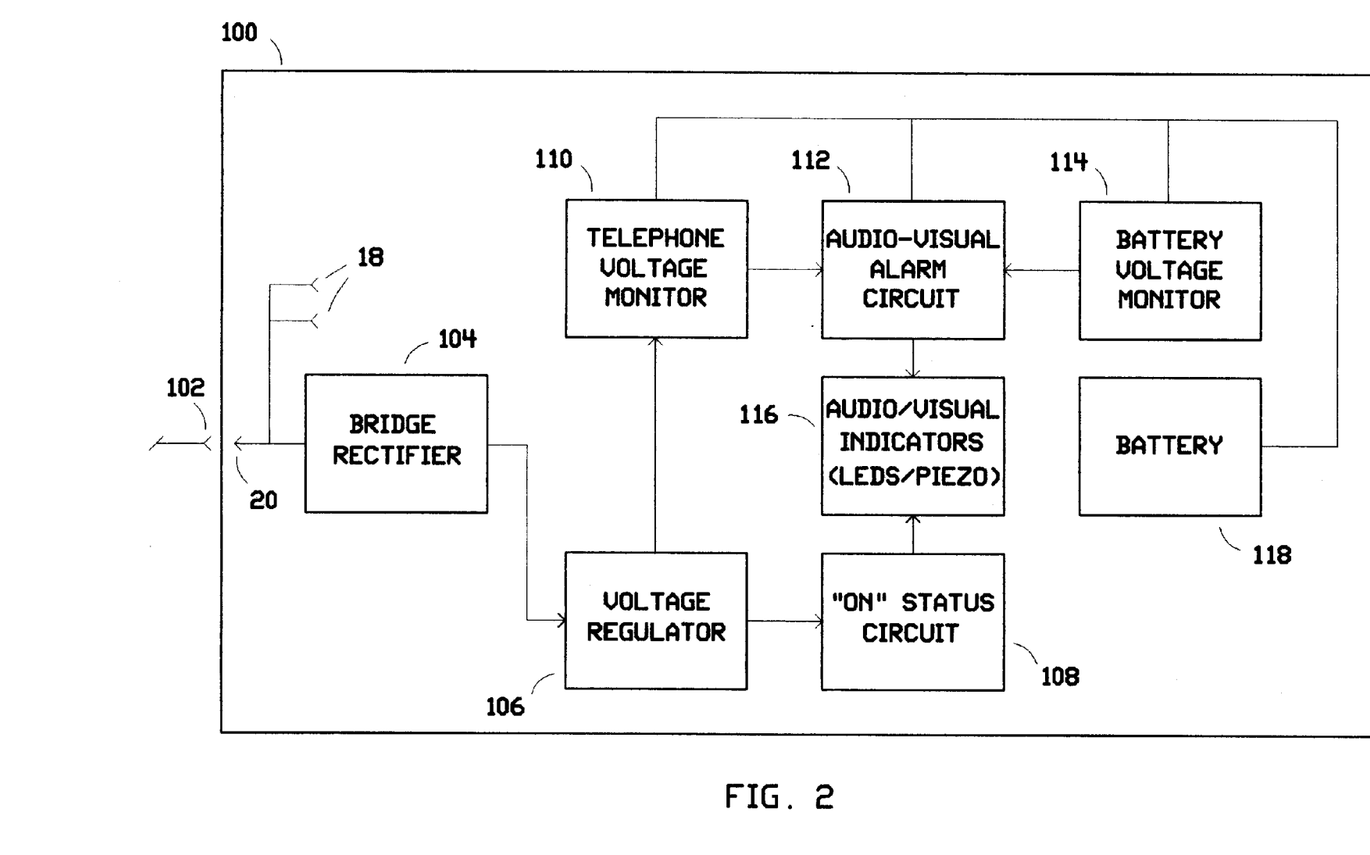
FIG. 2 illustrates a simplified electrical block diagram of a telephone line monitor and alarm apparatus, according to the principles of the invention.

The telephone line monitor and alarm apparatus of FIG. 2 illustrates, in block diagram form, an exemplary electrical circuit embodiment of the invention, collectively designated 100, wherein 104 is a first circuit means bridge rectifier, 106 is a second circuit means voltage regulator, 108 is a third circuit means ON status control circuit, 110 is a fourth circuit means telephone line voltage monitor, 112 is a fifth circuit means audio-visual alarm circuit and 114 is a sixth circuit means battery voltage monitor. Circuit means 108 and 112 communicate with audio-visual output devices designated 116, for example a piezoelectric audio transducer to generate an audible output and light emitting diodes (LEDs) to provide visual outputs. Circuit means 110, 112, 114 and 116 operate at micropower levels and are powered by battery means 118, independent of telephone line voltage. Circuit means 106 and 108 operate at micropower levels and are powered by the telephone line voltage, independent of battery means 118. Battery means 118, may be a standard 9 Volt type, 12 Volt miniature "remote control" type, or other suitable battery. Integral plug 20 provides plug-in connection means between telephone wall jack 102 and circuit means 100. Integral dual jack splitter 18, communicates with telephone wall jack 102 through integral plug 20, providing direct telephone line access to telephone equipment when the apparatus of the invention is in use.

Functionally described, telephone wall jack 102 typically provides a pair of ring and tip conductors for standard telephone equipment based on dial, pulse, or touch tone technologies, and may also have additional conductors for automated or computerized telephone equipment. A telephone line typically carries a voltage between ring and tip conductors of approximately 50 Volts when in the "on hook" state and 6 Volts when in the "off-hook" state. A disruption in telephone service resulting when one or both conductors are interrupted or when the conductors are shorted anywhere along the central office, service wire, or residential distribution portion of the telephone line will result in a loss, or substantial reduction, in line voltage at the subscriber's location compared to normal "on-hook" and "off-hook" values. In the preferred embodiment of the apparatus according to the invention illustrated in FIG. 2, circuit means 110 continuously senses telephone line voltage and generates a telephone line status control signal which assumes a first value alarm inhibit state when said voltage is higher than a minimum value, corresponding to normal telephone line operation, and a second value alarm enable state when said voltage is lower than said minimum value, corresponding to a disruption in telephone service. The control signal thus generated acts to inhibit or enable audio-visual alarm circuit means 112 and audio-visual indicators 116. Battery voltage monitor 114 continuously senses battery voltage and generates a battery status control signal which assumes a first value alarm inhibit state when battery voltage is higher than a minimum value, corresponding to normal battery operation, and a second value alarm enable state when said voltage is lower than a minimum value, corresponding to excessive battery discharge and the need for battery replacement. The control signal thus generated acts to inhibit or enable audio-visual alarm circuit means 112 and audio-visual indicators 116, the low battery voltage audio-visual alarm thus generated being different and distinct from the aforementioned alarm resulting from a disruption in telephone service. ON status circuit means 108, is interposed between voltage regulator 106 and audio-visual indicators 116, circuit means 108 and 116 collectively providing a visual indication when apparatus 100 is operational, said visual indication being different and distinct from both aforementioned alarm conditions resulting from a disruption in telephone service or the occurrence of low battery voltage. In order to accommodate the substantial voltage variations and polarity reversals which may occur on the telephone line, apparatus circuit means 100 includes a bridge rectifier circuit 104 and voltage regulator 106. Circuit means 104 and 106 therefore, operate to deliver a voltage of fixed polarity and magnitude to other circuit blocks of apparatus circuit means 100, irrespective of ring and tip conductor polarity, or voltage variations which occur during normal telephone line operation and use.

With continued reference to FIG. 2, the individual circuit blocks collectively comprising circuit means 100 may be implemented in a variety of ways. In particular, bridge rectifier circuit means 104, may be a full wave diode bridge configured with discrete diode components, or a single IC bridge rectifier device. Voltage regulator circuit means 106, may be a micropower regulator IC, op amp configured regulator, or simple transistor-zener diode regulator design. ON status circuit means 108, may be based on a micropower IC timer design, or discrete transistor timer configuration. Voltage monitor circuit means 110 and 114 may be implemented with micropower IC comparator-based circuit designs or high input impedance discrete transistor configurations. Finally, audio-visual alarm circuit means 112 may be any suitable circuit design operative to energize and de-energize audio-visual indicators 116, in cooperation with telephone and battery voltage monitor means 110 and 114. Examples of suitable implementations of circuit means 112 are CMOS IC gate designs for audio oscillator and LED timing functions, or discrete transistor-based configurations.

It is apparent from the foregoing description that the telephone line monitor and alarm apparatus of the present invention may incorporate a number of different circuit configurations while still embracing the novel features and essential requirements of the invention as set forth herein. The features which are considered critical to the function of the circuit aspect of the apparatus according to the invention are: 1. The conversion of telephone line voltage to a voltage of fixed polarity and magnitude, irrespective of ring and tip conductor polarity, or voltage variations which occur during normal telephone line operation and use. 2. The continuous monitoring of both telephone line voltage and battery voltage, with activation of an audio-visual alarm if either voltage falls below predefined thresholds, said alarm being distinctively associated with a loss of telephone service or need to replace the battery. 3. Visual indication of apparatus ON status, to distinguish from a situation where the apparatus may be plugged in, but switched OFF, said visual ON status indication being distinctive and different from visual alarm indications associated with loss of telephone service or low battery voltage. 4. The use of micropower circuit components and design techniques in order to minimize loading on the telephone line and ensure a battery life of at least one year.

Figure 3:
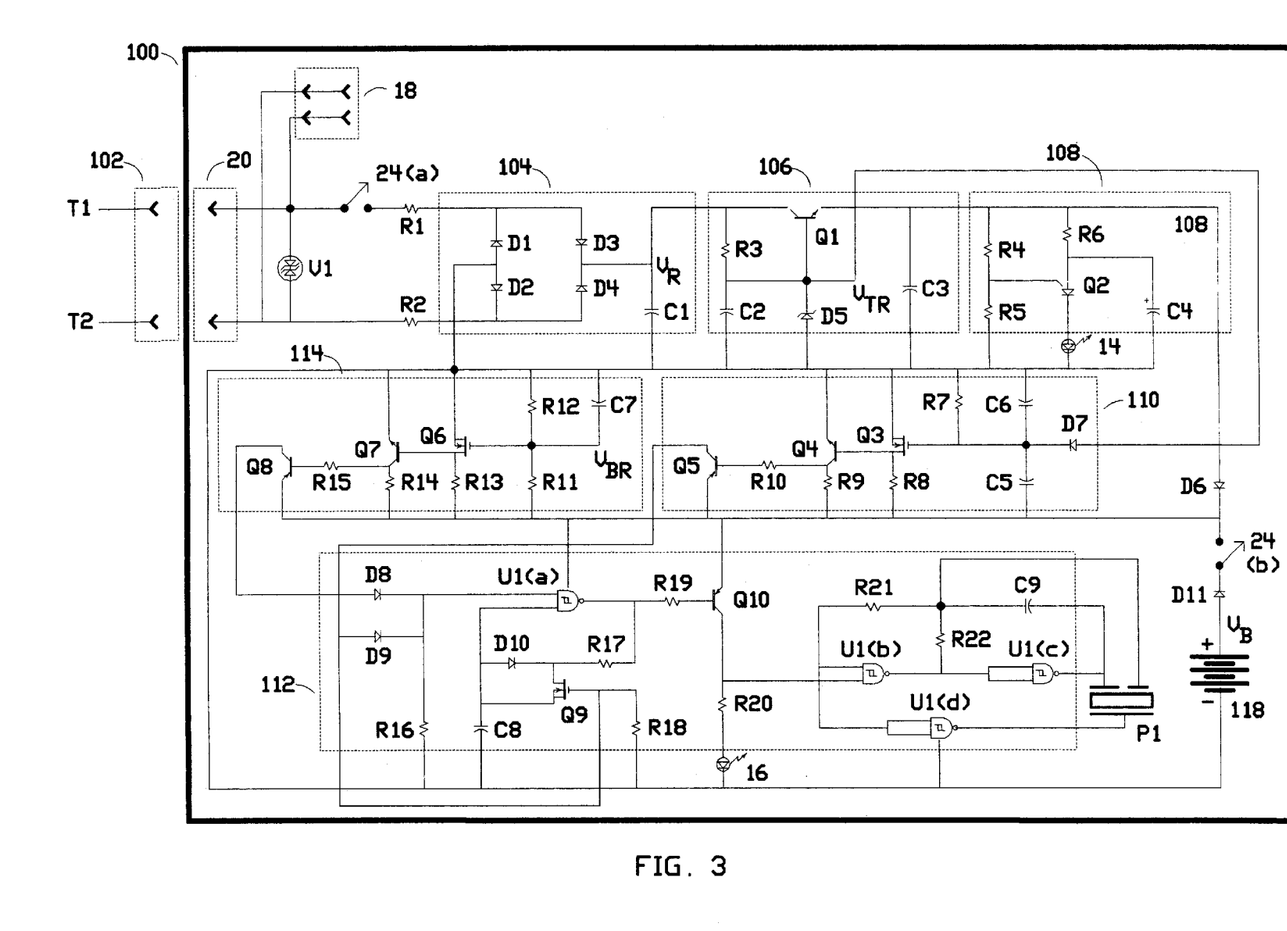
FIG. 3 illustrates a detailed circuit schematic of a preferred embodiment of a telephone line monitor and alarm apparatus, according to the principles of the invention.

By way of example and not limitation, a circuit schematic of a preferred embodiment of telephone line monitor and alarm circuit means 100 is illustrated in FIG. 3. The apparatus is plugged into wall jack 102 by means of integral plug 20, thereby making contact with ring and tip conductors T1 and T2. The telephone line connections thus made communicate with integral dual jack splitter 18, providing telephone line access to other equipment with the apparatus plugged into wall jack 102. Varistor V1 provides overvoltage protection for circuit means 100 and telephone equipment used through integral dual jack splitter 18, as may be occasioned by lightning surges conducted along the telephone line and otherwise present at wall jack 102. Resistors R1 and R2 are chosen to provide a sufficiently high input impedance so that telephone line loading is within acceptable requirements. Bridge rectifier circuit means 104, voltage regulator means 106 and ON status circuit means 108 are powered by telephone line voltage. Telephone voltage monitor means 110, audio-visual alarm circuit means 112 and battery voltage monitor means 114 are powered by battery means 118 with switch 24 ON. Diode D11 provides battery reverse polarity circuit protection.

Bridge rectifier circuit means 104, comprises diodes D1, D2, D3, D4 and capacitor C1, the diodes configured in full-wave bridge format and C1 operating to store the rectified voltage thus produced. Regulator circuit means 106, is a standard transistor-zener diode voltage reference configuration, comprising current limiting resistor R3, input capacitor C2, transistor Q1, zener diode D5 and output capacitor C3. Thus, bridge rectifier circuit means 104 operates to provide a positive voltage to regulator circuit means 106, regardless of telephone line voltage polarity, and regulator circuit means 106 operates to provide a voltage of fixed magnitude to other circuits of apparatus circuit means 100, regardless of telephone line voltage magnitude.

ON status circuit means 108, is a pulse generator based on programmable unijunction transistor Q2, gate bias resistors R4 and R5, and pulse timing components, resistor R6 and capacitor C4. When energized through regulator means 106, circuit means 108 operates to pulse ON status LED 14, with a pulse duration and frequency determined by components R4, R5, R6 and C4. Thus, circuit means 108 provides a continuous visual indication that the apparatus is switched ON, as opposed to plugged in but switched OFF.

In a preferred embodiment, the operational status of the telephone line is monitored by telephone voltage monitor means 110, comprising diode D7, capacitors C5 and C6, resistors R7, R8, R9 and R10, and transistors Q3, Q4 and Q5. Input transistor Q3 is configured as a voltage sensor to provide a low voltage output, substantially equal to zero, when the input voltage at its gate terminal is higher than a minimum threshold value, and a high V+ output, substantially equal to the positive battery voltage, when the voltage at its gate terminal falls below said threshold value. Transistors Q4 and Q5 serve as shaping stages to provide clean transitions and distinct voltage levels in response to the two possible voltage states at the gate terminal of Q3. Output transistor Q5 interfaces with audio-visual alarm circuit means 112, to inhibit or activate audio-visual indicator means 16 and P1, based on telephone line voltage. Capacitors C5 and C6 operate to introduce a time delay between transitions in input state and output state. Thus, the input to telephone voltage monitor means 110, is a voltage derived from the telephone line and having a value which is representative of the operational status of the line, and the output of means 110, is a control signal which serves to inhibit or activate telephone line audio-visual alarms.

Functionally described, a reference voltage $V_{TR}$, is derived at zener diode D5 from rectified telephone line voltage, $V_R$. The value of reference voltage $V_{TR}$, is determined by the zener voltage of D5 and remains substantially constant during normal telephone operation, even though rectified telephone voltage $V_R$ may see significant variations due to routine telephone line voltage changes. An exemplary range for $V_{TR}$ may be 4.0–8.0 V for normal telephone service conditions, with $V_{TR}$ falling significantly below this range if telephone line voltage is abnormally low, indicating a loss or serious degradation of telephone service. Reference voltage $V_{TR}$ thus derived, is applied to the gate of voltage sensor Q3 through diode D7. Q3 may be a MOS FET having a gate threshold in the 2–3 V range, thereby eliminating the need for a specific gate bias network and simplifying the input stage. Transistors Q4 and Q5 cooperate with Q3 to generate a telephone line control signal at the collector terminal of Q5 which assumes a low voltage first value alarm inhibit state when reference voltage $V_{TR}$ is greater than approximately 2–3 V, corresponding to normal telephone line operation, and a high voltage second value alarm enable state when $V_{TR}$ is lower than approximately 2–3 V, corresponding to a disruption in telephone service. The control signal thus generated at the collector terminal of transistor Q5 acts to inhibit or enable audio-visual alarm circuit means 112 and audio-visual indicators 16 and P1. Resistor-capacitor network comprising C5, C6 and R7 functions to produce a predefined time delay, determined by the values of these components and typically several seconds in duration, between the transition of $V_{TR}$ below the normal range and the onset of the alarm enable state at the output of Q5, said time delay to allow for brief and legitimate interruptions which may occur on the telephone line.

Battery voltage is continuously monitored by battery voltage monitor means 114, comprising capacitor C7, resistors R11, R12, R13, R14 and R15, and transistors Q6, Q7 and Q8. Input transistor Q6 is configured as a voltage sensor to provide a low voltage output, substantially equal to zero, when the input voltage at its gate terminal is higher than a minimum threshold value, and a high V+ output, substantially equal to the positive battery voltage, when the voltage at its gate terminal falls below said threshold value, in conventional format. Transistors Q7 and Q8 serve as shaping stages to provide clean transitions and distinct voltage levels in response to the two possible voltage states at the gate terminal of Q6. Output transistor Q8 interfaces with audio-visual alarm circuit means 112, to inhibit or activate audio-visual indicator means 16 and P1, based on battery voltage. Capacitors C7 and resistor R12 operate to introduce a time delay between transitions in input state and output state to allow for normal, short duration variations in battery voltage. The input to battery voltage monitor means 114, is a voltage derived from the battery through voltage divider R11 and R12, and having a threshold value for alarm activation which corresponds to battery depletion. The output of means 110 is a control signal which serves to inhibit or activate low battery voltage audio-visual alarm means 112 and audio-visual indicators 16 and P1. An advantageous feature of the invention is that regulated telephone line backup voltage is supplied to battery voltage monitor means and audio-visual alarm means through diode D6, providing low battery voltage alarm activation in the event that the apparatus is operated without a battery.

Reference voltage $V_{BR}$ at the gate of Q6 derived through voltage divider R11 and R12, is indicative of battery voltage $V_B$, decreasing with battery voltage over battery operating life. When $V_{BR}$ falls to the gate threshold voltage of MOS FET Q6, for example 2–3 V, a transition in the output of Q6 occurs. Thus, voltage divider R11 and R12 may be selected based on battery type and battery life objectives, with low battery alarm activation at 7 V for the case of 9 V battery types and 9 V for the case of 12 V battery types, for example. Transistors Q7 and Q8 cooperate with Q6 to generate a low battery voltage control signal at the collector terminal of Q8, said signal assuming a low voltage first value alarm inhibit state when voltage $V_{BR}$ is greater than the gate threshold voltage of Q6, corresponding to acceptable battery voltage, and a high voltage second value alarm enable state when $V_{BR}$ is lower than the gate threshold voltage of Q6, corresponding to low battery voltage and indicating the need for battery replacement. The control signal thus generated acts to inhibit or enable audio-visual alarm circuit means 112 and audio visual indicators 16 and P1, the low battery voltage audio-visual alarm thus generated being different and distinct from that associated with a loss of telephone service.

With continued reference to FIG. 3, there is illustrated a preferred circuit embodiment of audio-visual alarm circuit means 112. Quad dual-input NAND gate IC U1 is configured as two, gated, astable oscillators, a first modulation oscillator configured around IC gate U1(a) and a second audio oscillator configured around IC gates U1(b), U1(c) and U1(d). First modulation oscillator further comprises input components D8, D9 and R16, timing components D10, R17 and C8, control components Q9 and R18, output components R19, Q10, R20 and alarm LED 16. Second audio oscillator further comprises feedback component R21, timing components R22 and C9, and piezo acoustic element P1. First modulation oscillator is operative to enable second audio oscillator and alarm LED 16, in response to activation by telephone voltage monitor means 110 or battery voltage monitor means 114. Second audio oscillator is operative to generate an audio frequency signal to drive piezo acoustic element P1, said audio frequency signal being modulated ON and OFF by first modulation oscillator. The pulse duration and frequency generated by first modulation oscillator are different and distinct for the two alarm conditions associated with telephone voltage monitor means 110 and battery voltage monitor means 114. Thus, audio alarm piezo P1 and visual alarm LED 16 are activated in a pulsed mode when an alarm condition occurs, the pulse duration and frequency being characteristic of the alarm condition associated with a loss of telephone service or low battery voltage, for example rapid pulsing at 120 cpm or slow pulsing at 2 cpm, respectively.

Functionally described, telephone voltage monitor means 110 and battery voltage monitor means 114 provide inputs to audio-visual alarm circuit means 112, to activate visual alarm LED 16 and audio alarm piezo element P1. The dual alarm feature of audio-visual alarm circuit means 112 is effected by means of control component Q9, control component Q9 acting to produce two possible timing conditions for first modulation oscillator in response to alarm activation by telephone voltage monitor means 110 or battery voltage monitor means 114. With telephone voltage and battery voltage within normal operating limits, telephone voltage monitor means 110 and battery voltage monitor means 114 assume first "normal" states, wherein output transistors Q5 and Q8 provide low voltage alarm inhibit inputs to first modulation oscillator through signal isolating diodes D8 and D9. The output of first modulation oscillator is therefore a constant high level which maintains Q10 in its OFF state, disabling alarm LED 16 and second audio oscillator required to drive audio alarm piezo element P1. If battery voltage falls to a predefined low voltage threshold, battery voltage monitor means 114 assumes a second "alarm" output state wherein output transistor Q8 provides a high voltage alarm enable input to first modulation oscillator through diode D8. Control transistor Q9 maintains a high resistance OFF state, resulting in a long time constant, slow pulse rate first modulation oscillator output to alarm LED 16, and piezo P1 through second audio oscillator of circuit means 112. If telephone line voltage falls to a predefined low voltage threshold, telephone voltage monitor means 110 assumes a second "alarm" output state wherein output transistor Q5 provides a high voltage alarm enable input to first modulation oscillator means through diode D9. Control transistor Q9 assumes a low resistance ON state, resulting in a short time constant, high pulse rate first modulation oscillator output to alarm LED 16, and piezo P1 through second audio oscillator of circuit means 112. Thus, transistor Q9, under control of telephone voltage monitor means 110, acts on first modulation oscillator of audio-visual alarm means 112 to provide two distinct alarm conditions corresponding to loss of telephone service or low battery voltage.

From the foregoing description, it will be appreciated that this invention embraces the concept of continuous telephone line monitoring and audio-visual alarm activation if the telephone line becomes inoperative, said monitoring and alarm functions effected by means of an apparatus which is capable of direct plug-in connection to a standard telephone wall jack as a self-contained and autonomous unit without interconnecting cables or cable-plug attachments. In particular, upon providing an exemplary circuit, such as that illustrated in FIG. 3 in accordance with the principles of the invention disclosed in FIG. 2, and a mechanical assembly for said circuit, such as that illustrated in FIG. 1, there is provided a means for the practical implementation of the invention according to the preferred embodiments and advantageous features described herein. It will also be appreciated from the illustrations and description that this invention encompasses a number of preferred embodiments and advantageous features which permit its practical utilization by the general consumer having no special training or skill in the art to which the invention pertains. These preferred embodiments and advantageous features include, but are not limited to, the inclusion of a dual jack splitter as an integral part of the apparatus, pulsating audio-visual alarm functions for both telephone line and battery status, continuous visual ON status indication, low power electronics resulting in long battery life greater than 1 year and simple, low cost overall design to permit general, widespread utilization of the invention.

It will be appreciated that the principles of the invention as described herein can be applied in many ways of which the circuit of FIG. 3 and the mechanical assembly of FIG. 1 are but examples. In particular, the telephone plug and dual jack splitter which form an integral part of the mechanical assembly according to the invention as illustrated in FIG. 1, are commonly used in North America. However, other types of plugs and jacks, as well as a plurality of jack splitters other than dual jack splitters are available for North America and elsewhere, and may be used while preserving the general principles of the invention described herein. Also, in the exemplary embodiment of telephone line monitor and alarm apparatus hereinbefore described, the circuit implementation illustrated in FIG. 3 is based on commonly available discrete and integrated circuit components. In an alternate embodiment of the invention, the principles illustrated in FIG. 2 may be implemented through the use of microprocessor-based or application specific integrated circuit (ASIC) building blocks, thereby reducing printed circuit board complexity and improving product reliability. Therefore, as will be apparent to one skilled in the art, other circuit approaches may be used in the present invention while utilizing the concepts embodied herein.

Finally, this invention is not limited to voltage detection means to determine the integrity of the telephone line. In particular, a high input impedance, voltage threshold responsive circuit has been disclosed which assumes a first "normal" output state when telephone line voltage is above a predefined threshold value, corresponding to acceptable telephone line operation, and a second "alarm" output state if telephone line voltage falls below this threshold. Other electrical devices and circuit configurations can be used to monitor telephone line integrity, including the use of current and impedance sensing approaches instead of voltage responsive circuit means. Moreover, this invention is not limited to use with telephones, but may be used in conjunction with facsimile machines, modems, computers and other equipment which is normally connected to the telephone network, or autonomously on its own, in all cases providing a simple, effective and reliable means of continuous telephone line verification.

Therefore, this invention is not limited to those of its modes of employment, embodiments and uses which have been described explicitly. Rather, it encompasses all changes and modifications which may be derived by those skilled in the art and which are within the spirit, scope and extent of the invention as set forth in the following claims.

What is claimed is:

1. A telephone line monitoring and alarm apparatus for detecting the occurrence of a disruption or loss of telephone service and signalling an audio-visual alarm thereof, comprising electrical circuit means connecting to a DC voltage source to effect the monitoring and alarm functions, interface means to effect connection of said apparatus to the telephone line, and mechanical assembly means to enclose said electrical circuit and interface means, said electrical circuit means including regulator circuit means having a voltage of fixed polarity at its input, said voltage derived from a bridge rectifier circuit means, operative to produce a voltage of fixed magnitude from telephone line voltage when telephone line voltage magnitude is greater than a predefined minimum value.

2. An apparatus according to claim 1, wherein said telephone line monitoring and detection of a disruption or loss of telephone service comprises telephone line voltage threshold responsive circuit means operative to continuously monitor telephone line voltage through said bridge rectifier circuit means and said regulator circuit means, said voltage threshold responsive circuit means assuming a first normal output state when telephone line voltage is above a predefined threshold value, corresponding to standard telephone line operation, and a second alarm output state if telephone line voltage falls below standard telephone line voltage requirements, corresponding to a disruption or loss of telephone service.

3. An apparatus according to claim 2, wherein said telephone line voltage threshold responsive circuit means acts on audio-visual alarm circuit means to produce a first condition alarm inhibit state when telephone line voltage is higher than a predetermined minimum value, corresponding to normal telephone line operation, and a second condition alarm enable state when telephone line voltage is lower than said minimum value, corresponding to a disruption or loss of telephone service, said second condition alarm enable state resulting in audio-visual alarm circuit means generating a rapid pulsing of light emitting diode visual alarm means and synchronous pulsing of piezoelectric element audio alarm means with an audio frequency signal.

4. An apparatus according to claim 1, wherein said DC voltage source being a battery voltage, said electrical circuit means including a low battery voltage audio-visual alarm activation means having a battery voltage threshold responsive circuit means operative to continuously monitor battery voltage and assume a first normal output state when battery voltage is above a predefined threshold value, corresponding to acceptable battery voltage, and a second alarm output state if battery voltage is below said predefined threshold value, corresponding to battery depletion and need for battery replacement.

5. An apparatus according to claim 4, wherein said low battery voltage threshold responsive circuit means acts on audio-visual alarm circuit means to produce a first condition alarm inhibit state when battery voltage is higher than a predetermined minimum value, corresponding to acceptable battery voltage, and a second condition alarm enable state when battery voltage is lower than said minimum value, corresponding to battery depletion and need for battery replacement, said second condition alarm enable state resulting in audio-visual alarm circuit means generating a slow pulsing of light emitting diode visual alarm means and synchronous pulsing of piezoelectric element audio alarm means with an audio frequency signal.

6. An apparatus according to claim 5, wherein said low battery voltage audio-visual alarm means comprising said threshold responsive circuit means, audio-visual alarm circuit means, piezo element audio alarm means and light emitting diode visual alarm means, remains operational even when battery voltage is zero or no battery is installed in the apparatus, said low battery voltage audio-visual alarm means deriving backup power from telephone line voltage.

7. An apparatus according to claim 1, including a power ON status light emitting diode being under operative control of a pulse generator circuit means, said pulse generator circuit means producing a slow pulsing of ON status light emitting diode when the apparatus is switched ON and plugged into a telephone wall jack.

8. A telephone line monitoring and alarm apparatus for detecting the occurrence of a disruption or loss of telephone service and signalling an audio-visual alarm thereof, comprising electrical circuit means, interface means and mechanical assembly means, said electrical circuit means further comprising:

bridge rectifier circuit means operative to produce a voltage of fixed polarity from telephone line voltage, regardless of telephone line voltage polarity;

regulator circuit means operative to produce a voltage of fixed magnitude from rectified telephone line voltage when telephone line voltage magnitude is greater than a predefined minimum value;

telephone line voltage threshold responsive circuit means operative to continuously monitor rectified and regulated telephone line voltage, said voltage threshold responsive circuit means assuming a first normal output state when telephone line voltage is above a predefined threshold value, corresponding to standard telephone line operation, and a second alarm output state if telephone line voltage falls below standard telephone line voltage requirements, corresponding to a disruption or loss of telephone service;

battery voltage threshold responsive circuit means operative to continuously monitor battery voltage and assume a first normal output state when battery voltage is above a predefined threshold value, corresponding to acceptable battery voltage, and a second alarm output state if battery voltage is below said predefined threshold value, indicating that the apparatus battery must be installed or replaced;

audio-visual alarm circuit means capable of responding to telephone line and battery voltage threshold responsive circuit means by disabling audio-visual alarm means when said threshold responsive circuit means assume a first normal output state, or enabling audio-visual alarm means when said threshold responsive circuit means assume a second alarm output state, the alarm thus produced by said audio-visual alarm circuit means being different and distinct for the two alarm conditions corresponding to a disruption or loss of telephone service and low battery voltage;

pulse generator circuit means capable of producing a slow pulsing of ON status light emitting diode when the apparatus is switched ON and plugged into a telephone wall jack;

overvoltage and surge protection means for said electrical circuit means and for telecommunication equipment connected to the telephone line through apparatus integral jack splitter means;

high input impedance means operative to limit apparatus power consumption from the telephone line;

high input impedance means operative to limit apparatus power consumption from the battery;

battery reverse polarity protection means.

9. An apparatus according to claim 8, wherein said bridge rectifier circuit means comprises a full-wave diode bridge configuration, having telephone line voltage at its input and rectified telephone line voltage at its output.

10. An apparatus according to claim 8, wherein said regulator circuit means comprises a transistor-zener diode voltage reference configuration, said regulator circuit means having rectified telephone line voltage at its input and a predetermined regulated voltage at its output, said output voltage being indicative of telephone line operational status.

11. An apparatus according to claim 10, wherein said regulated output voltage provides operative power to ON status indicating means, comprising pulse generator circuit means and ON status light emitting diode, and telephone line operational status indicating input to telephone line voltage threshold responsive circuit means.

12. An apparatus according to claim 8, wherein said telephone line voltage threshold responsive circuit means comprises time delay means, high impedance input transistor means and transistor buffer means.

13. An apparatus according to claim 12, wherein said time delay means comprises diode, resistor and capacitor means operative to produce a time delay from the occurrence of a disruption or loss of telephone service and the activation of audio visual alarm means thereof, said time delay having a predetermined duration of several seconds to allow for brief and legitimate interruptions which may occur on the telephone line.

14. An apparatus according to claim 12, wherein said high impedance input transistor means is configured as a voltage sensor to provide a low voltage output, substantially equal to zero, when rectified and regulated telephone line voltage input is higher than a minimum threshold value, and a high V+ output, substantially equal to the battery voltage, when said voltage falls below said threshold value.

15. An apparatus according to claim 12, wherein said transistor buffer means comprises an output transistor and a voltage shaping transistor, said output transistor interfacing with audio-visual alarm circuit means to inhibit or activate audio-visual alarm means in response to telephone line status, and said voltage shaping transistor interposed between high impedance input transistor and said output transistor to provide clean transitions and distinct voltage levels in response to high impedance input transistor output.

16. An apparatus according to claim 8, wherein said battery voltage threshold responsive circuit means comprises time delay means, high impedance input transistor means and transistor buffer means.

17. An apparatus according to claim 16, wherein said time delay means comprises resistor and capacitor means operative to produce a time delay from the occurrence of a low battery voltage condition and the activation of audio-visual alarm means thereof, said time delay having a predetermined duration of several seconds to allow for brief and legitimate battery voltage changes which may occur during normal operation of the apparatus.

18. An apparatus according to claim 16, wherein said high impedance input transistor means is configured as a voltage sensor to provide a low voltage output, substantially equal to zero, when battery voltage is higher than a minimum threshold value, and a high V+ output, substantially equal to the battery voltage, when said voltage falls below said threshold value.

19. An apparatus according to claim 16, wherein said transistor buffer means comprises an output transistor and a voltage shaping transistor, said output transistor interfacing with audio-visual alarm circuit means to inhibit or activate audio-visual alarm means in response to battery voltage status, and said voltage shaping transistor interposed between high impedance input transistor and said output transistor to provide clean transitions and distinct voltage levels in response to high impedance input transistor output.

20. An apparatus according to claim 8, wherein said audio-visual alarm circuit means comprises two, gated, astable oscillators, a first modulation oscillator and a second audio oscillator, said first modulation oscillator being operative to enable said second audio oscillator and alarm light emitting diode, in response to activation by telephone line monitor means or battery voltage monitor means.

21. An apparatus according to claim 20, wherein said second audio oscillator is operative to generate an audio frequency signal to drive piezo acoustic element, said audio frequency signal being modulated ON and OFF by first modulation oscillator, the pulse duration and frequency thus generated being different and distinct for the two alarm conditions associated with a disruption or loss of telephone service and low battery voltage.

22. An apparatus according to claim 20, wherein said first modulation oscillator means comprises signal isolating input means, logic gate means, oscillator timing means, timing control means and output driver means.

23. An apparatus according to claim 22, wherein said signal isolating input means comprises diodes operative to provide separate input signal paths to audio-visual alarm circuit means for the outputs of telephone line and battery voltage threshold responsive circuit means.

24. An apparatus according to claim 22, wherein said logic gate means comprises a dual-input logic NAND gate configured as a gated astable oscillator, in cooperation with signal isolating input means, oscillator timing means and timing control means.

25. An apparatus according to claim 22, wherein said oscillator timing means comprises diode, resistor and capacitor means operative to provide a desired time constant, with associated duty cycle and frequency, for first modulation oscillator means.

26. An apparatus according to claim 22, wherein said timing control means comprises transistor and resistor means operative to provide two possible audio-visual alarm conditions in response to activation by telephone voltage monitor means or battery voltage monitor means, said dual alarm capability effected by timing control means in cooperation with oscillator timing means.

27. An apparatus according to claim 22, wherein said output driver means comprises resistor, transistor and alarm light emitting diode means operative to provide a switching means for said alarm light emitting diode and logic input for second audio oscillator means, in response to first modulation oscillator output.

28. An apparatus according to claim 20, wherein said second audio oscillator means comprises logic gate means, resistor and capacitor oscillator timing means, resistor feedback control means and piezo audio alarm element means.

29. An apparatus according to claim 28, wherein said logic gate means comprises dual-input logic NAND gates configured as a gated astable audio oscillator in cooperation with oscillator timing means and feedback control means, said astable audio oscillator operative to drive piezo audio alarm element means with an audio frequency signal upon receiving an enabling input from first modulation oscillator means in response to the occurrence of a telephone line or battery voltage alarm condition.

30. An apparatus according to claim 8, wherein said pulse generator circuit means comprises programmable unijunction transistor means operative to drive ON status light emitting diode, resistive voltage divider gate bias means, and pulse timing resistor and capacitor means, said bias and timing means cooperating with programmable unijunction transistor means to establish the pulse duration and frequency of ON status light emitting diode.

31. An apparatus according to claim 8, wherein said overvoltage and surge protection means comprises a voltage limiting and surge suppression device connected in parallel with the telephone line input conductors.

32. An apparatus according to claim 8, wherein said electrical circuit means comprises high impedance, micropower circuit components and configurations to reduce telephone line loading and extend battery life.

33. An apparatus according to claim 8, wherein said battery reverse polarity protection means comprises a diode connected in series between said battery and circuit means, said diode configured to permit the flow of current to the apparatus when battery polarity is correct and block current flow thereto when battery polarity is incorrect, as may be occasioned by incorrect battery installation.

* * * * *